(12) United States Patent
Kuokkanen et al.

(10) Patent No.: US 9,882,772 B2
(45) Date of Patent: Jan. 30, 2018

(54) NETWORK ELEMENT AND A CONTROLLER FOR MANAGING THE NETWORK ELEMENT

(71) Applicant: TELLABS OY, Espoo (FI)

(72) Inventors: Vesa Kuokkanen, Espoo (NL); Juhamatti Kuusisaari, Helsinki (FI)

(73) Assignee: CORIANT OY, Espoo (FI)

( * ) Notice: Subject to any disclaimer, the term of this patent is extended or adjusted under 35 U.S.C. 154(b) by 315 days.

(21) Appl. No.: 14/596,681

(22) Filed: Jan. 14, 2015

(65) Prior Publication Data
US 2015/0207676 A1 Jul. 23, 2015

(30) Foreign Application Priority Data

Jan. 17, 2014 (FI) .................................... 20145041

(51) Int. Cl.
| | |
|---|---|
| G06F 15/16 | (2006.01) |
| H04L 12/24 | (2006.01) |
| H04L 12/717 | (2013.01) |
| H04L 12/715 | (2013.01) |

(52) U.S. Cl.
CPC .......... H04L 41/0803 (2013.01); H04L 45/42 (2013.01); *H04L 45/64* (2013.01)

(58) Field of Classification Search
CPC ..... H04L 45/42; H04L 45/38; H04L 41/0803; H04L 41/0806; H04L 41/0893
See application file for complete search history.

(56) References Cited

U.S. PATENT DOCUMENTS

| | | | |
|---|---|---|---|
| 7,606,241 | B1 | 10/2009 | Raghunathan et al. |
| 2002/0099787 | A1 | 7/2002 | Bonner et al. |
| 2009/0318193 | A1 | 12/2009 | Littlefield et al. |

(Continued)

FOREIGN PATENT DOCUMENTS

| | | |
|---|---|---|
| EP | 1 220 492 A2 | 7/2002 |
| WO | 2013-063329 | 5/2013 |

OTHER PUBLICATIONS

FI Office Action, dated Nov. 19, 2015; Application No. 20145041.
(Continued)

*Primary Examiner* — Tauqir Hussain
*Assistant Examiner* — Kamran Mohammadi
(74) *Attorney, Agent, or Firm* — Young & Thompson

(57) ABSTRACT

A method for configuring network elements of a software-defined network includes receiving (401) configuration data at one of the network elements, constructing (402) a configuration system of the network element on the basis of the configuration data, addressing (403) by the network element the configuration data or an appropriate portion of it to at least one other of the network elements, and transmitting (404) in accordance with the configuration system at least the appropriate portion of the configuration data to the other network element. The other network element, in turn, constructs its configuration system on the basis of the configuration data received by it and possibly transmits at least a portion of the configuration data to still one or more other network elements. Thus, the network elements represent a single entity from the viewpoint of a controller of the software-defined network. Hence, the scalability of the software-defined network is improved.

17 Claims, 5 Drawing Sheets

(56) References Cited

U.S. PATENT DOCUMENTS

2012/0008629 A1* 1/2012 Chiba .................... H04L 45/34
370/392
2013/0114466 A1* 5/2013 Koponen ............ H04L 41/0893
370/255

OTHER PUBLICATIONS

FI Search Report, dated Aug. 21, 2014, from corresponding FI application.
European Search Report, dated May 20, 2015, from corresponding European application No. 15 15 1210.

* cited by examiner

US 9,882,772 B2

NETWORK ELEMENT AND A CONTROLLER FOR MANAGING THE NETWORK ELEMENT

FIELD OF THE INVENTION

The invention relates generally to software-defined networking. More particularly, the invention relates to a network element for a software-defined network "SDN" and to a controller for a software-defined network. Furthermore, the invention relates to a method for configuring a software defined network. Furthermore, the invention relates to a computer program for a network element of a software-defined network and to a computer program for a controller of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the soft-ware-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

In the following, the software-defined networking is illustrated in a simplified manner using the analogy to the ordinary postal service. For any given street location, the software-defined networking works so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements. Traditionally, the network elements are configured so that the controller sends to each network element configuration data with the aid of which the network element constructs a configuration system. The configuration system enables the network element to operate as a part of a software-defined network "SDN". The configuration system may comprise for example one or more look-up tables defining actions to be carried out in different operational situations. One of the challenges is related to the scalability when the number of network elements to be managed by a single controller increases.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for configuring a software-defined network "SDN". A method according to the invention comprises:
  receiving, at a network element of the software-defined network, configuration data from the software-defined network,
  constructing, at the network element, a configuration system of the network element on the basis of a first portion of the configuration data, the configuration system enabling the network element to operate as a part of the software-defined network,
  addressing, at the network element, at least a second portion of the configuration data to at least one first other network element of the software-defined network, the second portion of the configuration data comprising data for configuring two or more other network elements including the first other network element, and
  transmitting, from the network element and in accordance with the configuration system, at least the second portion of the configuration data to the first other network element so as to enable the first other network element to construct a configuration system of the first other network element.

The first other network element constructs its configuration system on the basis of the configuration data received at the first other network element, and depending on the case, further transmits one or more appropriate portions of the configuration data to one or more network elements to be configured. Therefore, the above-mentioned network elements represent a single manageable entity from the viewpoint of the controller of the software-defined network. Hence, the scalability of the software-defined network can be improved because the number of entities to be managed by the controller can be reduced.

In accordance with the invention, there is provided also a new network element for a software-defined network. The network element can be, for example, an Internet Protocol "IP" router, a multiprotocol label switching "MPLS" switch, a packet optical switch, and/or an Ethernet switch. A network element according to the invention comprises:
- a data transfer interface for transmitting data to the software-defined network and for receiving data from the software-defined network, and
- a processing system for implementing a forwarding-section and a control section.

The forwarding-section is adapted to maintain a configuration system enabling the network element to operate as a part of the software-defined network, and the control-section is adapted to:
- construct the configuration system on the basis of a first portion of configuration data received from the software-defined network,
- address at least a second portion of the configuration data to at least one first other network element of the software-defined network, the second portion of the configuration data comprising data for configuring two or more other network elements including the first other network element, and
- deliver at least the second portion of the configuration data to the forwarding-section so as to transmit at least the second portion of the configuration data to the first other network element in accordance with the configuration system constructed on the basis of the first portion of the configuration data.

In accordance with the invention, there is provided also a new controller for configuring network elements of a software-defined network "SDN". The controller can be a part of a controller system constituted by many controllers of the software-defined network. It is also possible that the controller alone constitutes the controller system of the software-defined network. Furthermore, the controller can be a single apparatus or a combination of a plurality of apparatuses capable of communicating with each other. A controller according to the invention comprises a data transfer interface for transmitting data to the software-defined network and for receiving data from the software-defined network, and a processing system for:
- generating configuration data enabling at least three of the network elements to operate as parts of the software-defined network,
- providing the configuration data with information expressing network element-specific portions of the configuration data,
- addressing the configuration data to one of the at least three of the network elements, and
- controlling the data transfer interface to transmit the configuration data to the one of the at least three of the network elements.

In accordance with the invention, there is provided also a new computer program for a network element of a software-defined network. The computer program comprises computer executable instructions for controlling a programmable processing system of the network element to:
- construct a configuration system of the network element on the basis of a first portion of configuration data received from the software-defined network, the con-figuration system enabling the network element to operate as a part of the software-defined network,
- address at least a second portion of the configuration data to at least one first other network element of the software-defined network, the second portion of the configuration data comprising data for configuring two or more other network elements including the first other network element, and
- deliver at least the second portion of the configuration data to a forwarding-section of the network element so as to transmit at least the second portion of the configuration data to the first other network element in accordance with the configuration system constructed on the basis of the first portion of the configuration data.

In accordance with the invention, there is provided also a new computer program for a controller of a software-defined network. The computer program comprises computer executable instructions for controlling a programmable processing system of the controller to:
- generate configuration data enabling at least three network elements to be configured to operate as parts of the software-defined network,
- provide the configuration data with information expressing network element-specific portions of the configuration data,
- address the configuration data to one of the at least three network elements, and
- control the data transfer interface to transmit the configuration data to the one of the at least three network elements.

In accordance with the invention, there is provided also a new computer program product. The computer program product comprises a non-volatile computer readable medium, e.g. a compact disc "CD", encoded with a computer program according to the invention for a network element of a software-defined network and/or with a computer program according to the invention for a controller of the software-defined network.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
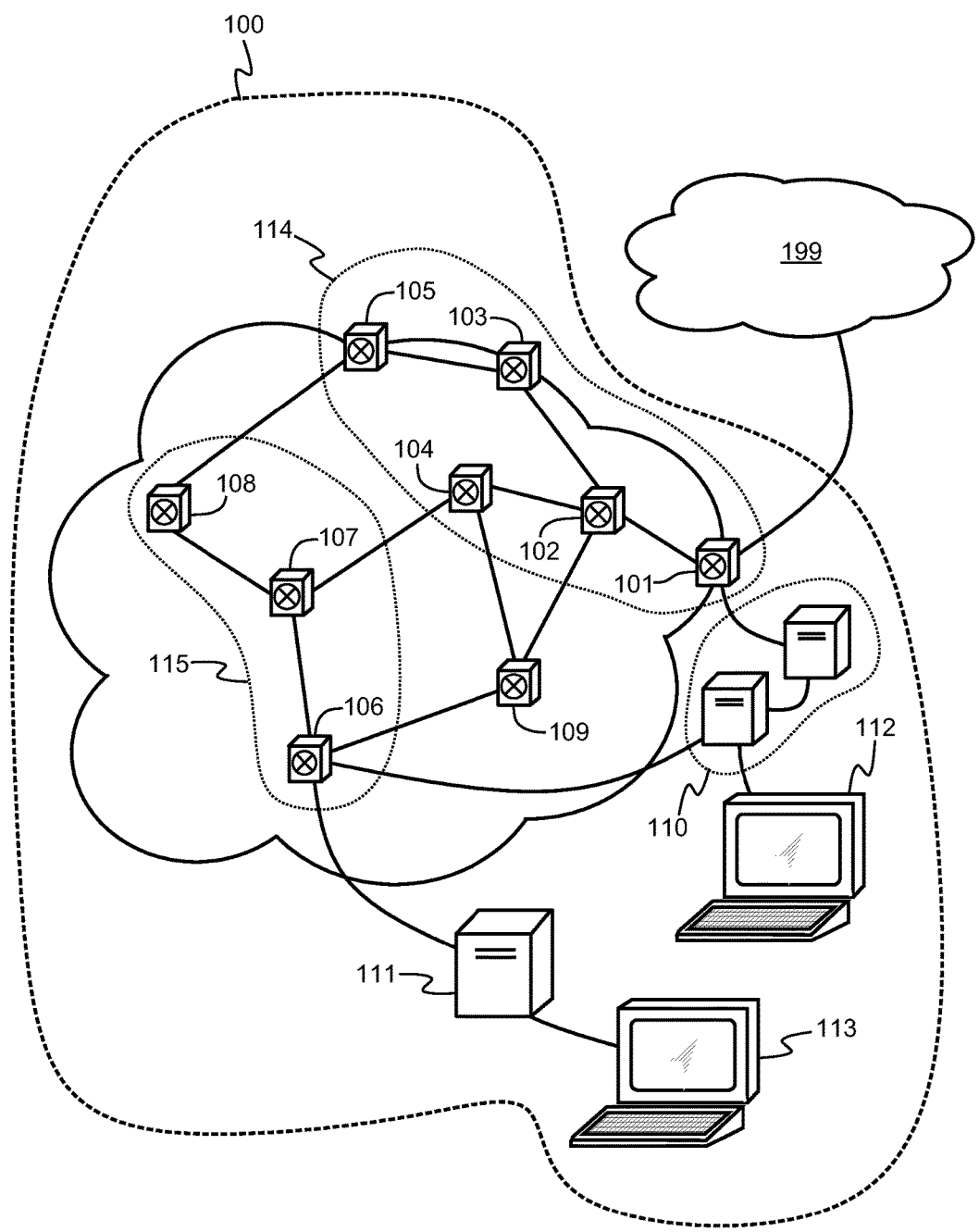
FIG. 1 shows a schematic illustration of a software-defined network comprising network elements according to an exemplifying embodiment of the invention and controllers according to an exemplifying embodiment of the invention.

FIG. 1 shows a schematic illustration of an exemplifying software-defined network "SDN" 100. The software-defined network comprises network elements 101, 102, 103, 104, 105, 106, 107, 108, and 109. The software-defined network 100 further comprises controllers 110 and 111 that can be deemed to constitute a controller system of the software-defined network. The network elements 101-109 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, each of the controllers 110 and 111 may consist of a single apparatus or a combination of a plurality of apparatuses. In the exemplifying case illustrated in FIG. 1, the controller 110 comprises two interconnected apparatuses. A user-interface device 112 is communicatively connected to the controller 110, and correspondingly a user-interface device 113 is communicatively connected to the controller 111. In the exemplifying case illustrated in FIG. 1, the network element 101 acts as a gateway to an external network 199 that can be e.g. the global Internet. It is to be noted that the controller 110 or one or more parts of it can also act as a network element that can be e.g. an Internet Protocol "IP" router, a multiprotocol label switching "MPLS" switch, a packet optical switch, and/or an Ethernet switch. Correspondingly, the controller 111 or one or more parts of it can also act as a network element of the kind mentioned above.

Without limiting the generality and merely for illustrative purposes, we consider the operation of the controller 110 and the operation of the network elements 101-105. The controller 111 may operate in the similar way as the controller 110, and/or the controller 111 may constitute a backup for the controller 110 and vice versa. The controller 110 is adapted to determine configuration data enabling the network elements 101-105 to operate as parts of the software-defined network 100. The configuration data comprises portions related to the network elements 110-105 to be configured. The network element-specific portions of the configuration data are not necessarily mutually non-overlapping since the configuration data may comprise data that is common to two or more of the network elements 101-105. A relevant portion of the configuration data related to one of the network elements enables the network element under consideration to construct a configuration system that enables the network element to manage data in a desired manner. The configuration data is provided with information that expresses the network element-specific portions of the configuration data, i.e. the portions related to the network elements 101-105. The data to be managed by the network element can be in form of data frames such as for example Internet Protocol IP-packets, MPLS-labeled frames, Ethernet frames, or the data can be in some other form accordant with one or more data transfer protocols being used. The configuration system of each network element may comprise for example a system of interconnected look-up tables defining actions to be carried out in different operational situations. The look-up tables may include for example one or more successive flow tables and a group table. Each flow table contains a set of flow entries. Each flow entry may consist of match fields, counters, and a set of actions to apply to matching data frames. The group table contains group entries, where each group entry may contain a list of actions to be directed to data frames defined to belong to a particular group. An action defined by the configuration data may comprise for example: recording data into a memory, modifying the data, selecting one or more of egress ports of the network element and forwarding the data and its possible duplicates to the selected one or more egress ports, selecting one or more look-up tables of the configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

In the exemplifying case illustrated in FIG. 1, the controller 110 delivers the configuration data to the network element 101 which constructs its configuration system on the basis of the relevant portion of the configuration data and thereafter utilizes its configuration system for transmitting the configuration data, or at least the portions of the configuration data related to the network elements 102-105, to the network element 102. The network element 102, in turn, constructs its configuration system on the basis of the relevant portion of the configuration data and thereafter utilizes its configuration system for transmitting the configuration data, or at least the portion related to the network element 104, to the network element 104 and for transmitting the configuration data, or at least the portions related to the network elements 103 and 105, to the network element 103. Correspondingly, the network elements 104 and 103 construct their configuration systems on the basis of the relevant portions of the configuration data, and the network element 103 utilizes its configuration system for transmitting the configuration data, or at least the portion related to the network element 105, to the network element 105. Finally, the network element 105 constructs its configuration system. The controller 110 and the network element 101 can be arranged to run OpenFlow or some other suitable configuration protocol in order to transfer the configuration data from the controller 110 to the network element 101. More details about the above-mentioned OpenFlow can be found from "OpenFlow Switch Specification" managed by the Open Networking Foundation "ONF". The controller 110 needs to maintain an OpenFlow management connection or another configuration protocol session only with the network element 101. The OpenFlow management connection can be based on for example the Transmission Control Protocol "TCP". Each network element utilizes its configuration system, i.e. its data plane, for forwarding the appropriate configuration data to other network elements. Hence, from the viewpoint of the controller 110, the network elements 101-105 constitute a single manageable entity 114 where the network element 101 is an interfacing network element of the manageable entity 114. Correspondingly, the network elements 106-108 are arranged to constitute a single manageable entity 115. The network element 109 is assumed to be controlled as an individual network element, i.e. the network element 109 alone constitutes a manageable entity. Therefore, in the exemplifying case illustrated in FIG. 1, the controllers 110 and/or 111 need to run configuration sessions only with three manageable entities instead of running configuration sessions with all the nine network elements 101-109. Therefore, the number of configuration sessions and management load are reduced, and the scalability of the software-defined network is improved.

In a software-defined network according to an exemplifying embodiment of the invention, the manageable entity 114 is defined with the aid of the configuration data delivered from the controller 110 to the network element 101. The network element 101 is adapted to read, from the configuration data, group information that expresses that the network element 101 has to transmit configuration data to the network element 102. Correspondingly, the network element 102 is adapted to read, from the configuration data received by it, group information that expresses that the network element 102 has to transmit configuration data to the network elements 103 and 104, and the network element 103 is adapted to read, from the received configuration data, group information that expresses that the network element 103 has to transmit configuration data to the network element 105. The group information may further express that e.g. the configuration data to be transmitted to the network element 102 has to comprise at least the portions of the configuration data related to the network elements 102-105. It is, however, also possible that the group information does not indicate the network element-specific portions of the configuration data. In this case, each network element can be adapted to forward all configuration data received at the network element under consideration to other network elements indicated by the group information. In a software-defined network according to another exemplifying embodiment of the invention, the manageable entities 114 and 115 are defined by pre-determined group information available to the network elements prior to the reception of the configuration data. The group information can be stored for example in memories of the network elements.

Figure 2:
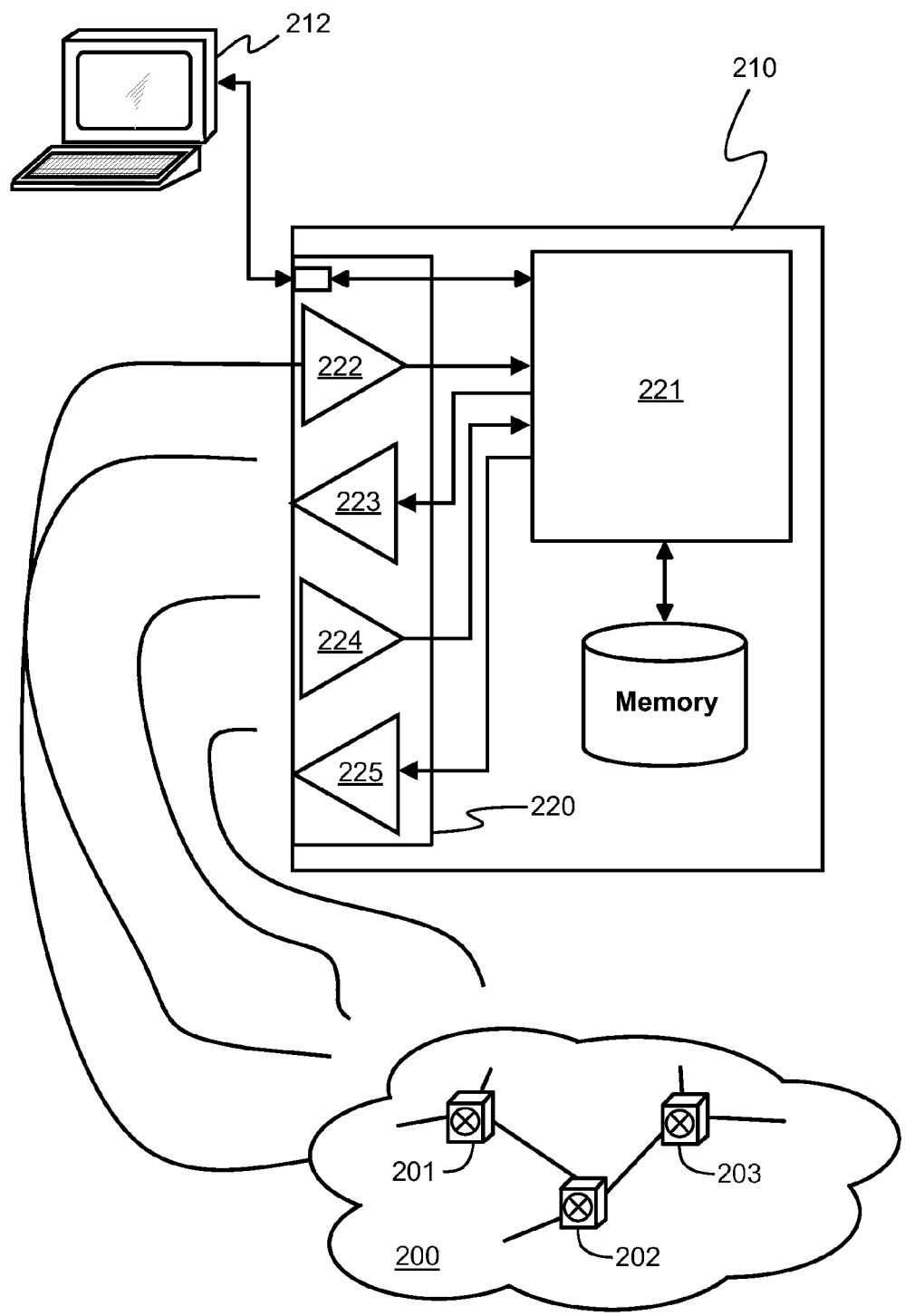
FIG. 2 shows a schematic illustration of a controller according to an exemplifying embodiment of the invention for configuring network elements of a software-defined network.

FIG. 2 shows a schematic illustration of a controller 210 according to an exemplifying embodiment of the invention for configuring network elements 201, 202, and 203 of a software-defined network. In the exemplifying case illustrated in FIG. 2, the controller is a single apparatus but, as mentioned earlier in this document, the controller could as well be a combination of a plurality of apparatuses. The controller comprises a data transfer interface 220 for receiving data and for transmitting data. The data transfer interface 220 comprises ingress ports 222 and 224 and egress ports 223 and 225 for connecting via data transfer links to other elements of the software-defined network. In FIG. 2, the elements of the soft-ware-defined network other than the controller 210 are depicted with a cloud 200. The data transfer interface 220 may further comprise one or more data ports for connecting to a user interface device 212 and/or to other peripheral devices. The controller 210 comprises a processing system 221 for determining configuration data enabling each of the network elements 201-203 to construct a configuration system so as to enable the network element under consideration to operate as a part of the software-defined network. The configuration data comprises network element-specific portions related to the network elements 201-203 to be configured, and the processing system 221 is adapted to provide the configuration data with information expressing the network element-specific portions of the configuration data. The processing system 221 is adapted to address the configuration data to one of the network elements 201-203, and to control the data transfer interface to transmit the configuration data to the one of the network elements. Without limiting the generality and merely for illustrative purposes, the network element 201 can be assumed to be the one of the network elements. The processing system 221 can be arranged to run OpenFlow or some other suitable configuration protocol with the network element 201 in order to transfer the configuration data from the controller 210 to the network element 201.

In a controller according to an exemplifying embodiment of the invention, the processing system 221 is adapted to provide the configuration data with group information enabling each of the network elements to be aware of one or more other of the network elements to be configured with the aid of the configuration data received at the network element under consideration. In this case, the manageable entity comprising the network elements 201-203 is defined with the aid of the configuration data delivered from the controller 210 to the network element 201.

The processing system 221 of the controller 210 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3A:
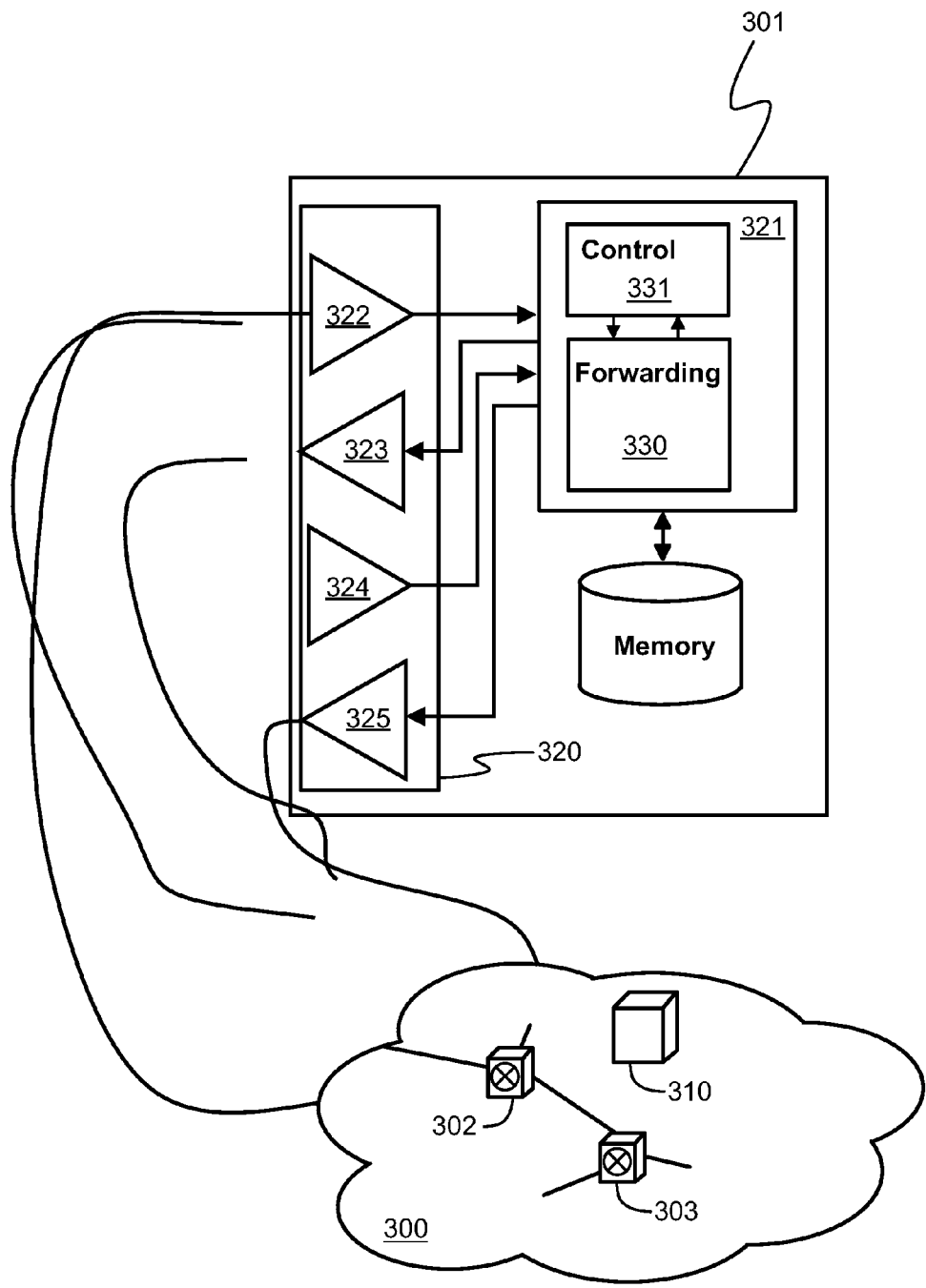
FIGS. 3a and 3b show schematic illustrations of a network element according to an exemplifying embodiment of the invention.

FIG. 3a shows a schematic structural block-diagram of a network element 301 according to an exemplifying embodiment of the invention for a software-defined network. The network element 301 can be, for example, an Internet Protocol "IP" router, a Multiprotocol label switching "MPLS" switch, a packet optical switch, and/or an Ethernet switch. The network element 301 comprises a data transfer interface 320 for receiving data and for transmitting data. The data transfer interface 320 comprises ingress ports 322 and 324 and egress ports 323 and 325 for connecting via data transfer links to other elements of the software-defined network. In FIG. 3a, the elements of the software-defined network other than the network element 301 are depicted with a cloud 300. The network element 301 comprises a processing system 321 for implementing a forwarding-section 330 and a control section 331. The forwarding-section 330 is adapted to maintain a configuration system enabling the network element to operate as a part of the software-defined network. The control-section 331 is adapted to:

construct the configuration system on the basis of a first portion of configuration data received from the software-defined network,
  address at least a second portion of the configuration data to at least one first other network element 302 of the software-defined network, the second portion of the configuration data comprising data for configuring two or more other network elements 302 and 303 including the first other network element 302, and
  deliver at least the second portion of the configuration data to the forwarding-section 330 so as to transmit at least the second portion of the configuration data to the first other network element 302 in accordance with the configuration system constructed on the basis of the first portion of the configuration data.

The processing system 321 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

In a network element according to an exemplifying embodiment of the invention, the control section 331 is adapted to read, from the configuration data, group information identifying the first other network element 302 to be configured with the aid of the configuration data. The control section 331 is adapted to address at least the second portion of the configuration data to the first other network element 302 on the basis of the group information. In a network element according to another exemplifying embodiment of the invention, the control section 331 is adapted to address at least the second portion of the configuration data to the first other network element 302 on the basis of pre-determined group information which is available to the control section prior to the reception of the configuration data.

In a network element according to an exemplifying embodiment of the invention, the processing system 321 is adapted to store the configuration data to a database so as to enable the network element 301 to reconstruct the configuration system and to retransmit at least the second portion of the configuration data to the first other network element 302. The reconstruction of the configuration system and/or the retransmission of at least the second portion of the configuration data can be needed after a power failure in one or more of the network elements 301-303 or after some other disturbance occurred in one or more of the network elements 301-302.

Each of the networks elements 301-303 is advantageously adapted to handle received data in the following three-phase manner. If the forwarding-section is capable of determining and carrying out actions related to the data, the data is processed by the forwarding-section. If the forwarding-section is incapable of determining the actions related to the data, the data is delivered from the forwarding section to the control-section. If the control-section is capable of determining and carrying out actions related to the data, the data is processed by the control section-section, but if the control-section is incapable of determining the actions related to the data, the control-section establishes a management connection in accordance with OpenFlow or some other suitable protocol with a controller 310 of the software defined network and delivers the data to the controller for further processing. Hence, the control-section operates as a local controller and the co-operation with the controller 310 is needed only when the local controller, i.e. the control-section, is incapable of determining and carrying out actions related to the received data. It is also possible that the received data contains information which indicates whether the data is to be processed locally or to be delivered to the controller 310. In this case, the control-section is adapted to determine and carry out the actions related to the data under consideration in a case where the data contains information indicative of local processing, and otherwise to control the data to be delivered to the controller 310.

Figure 3B:
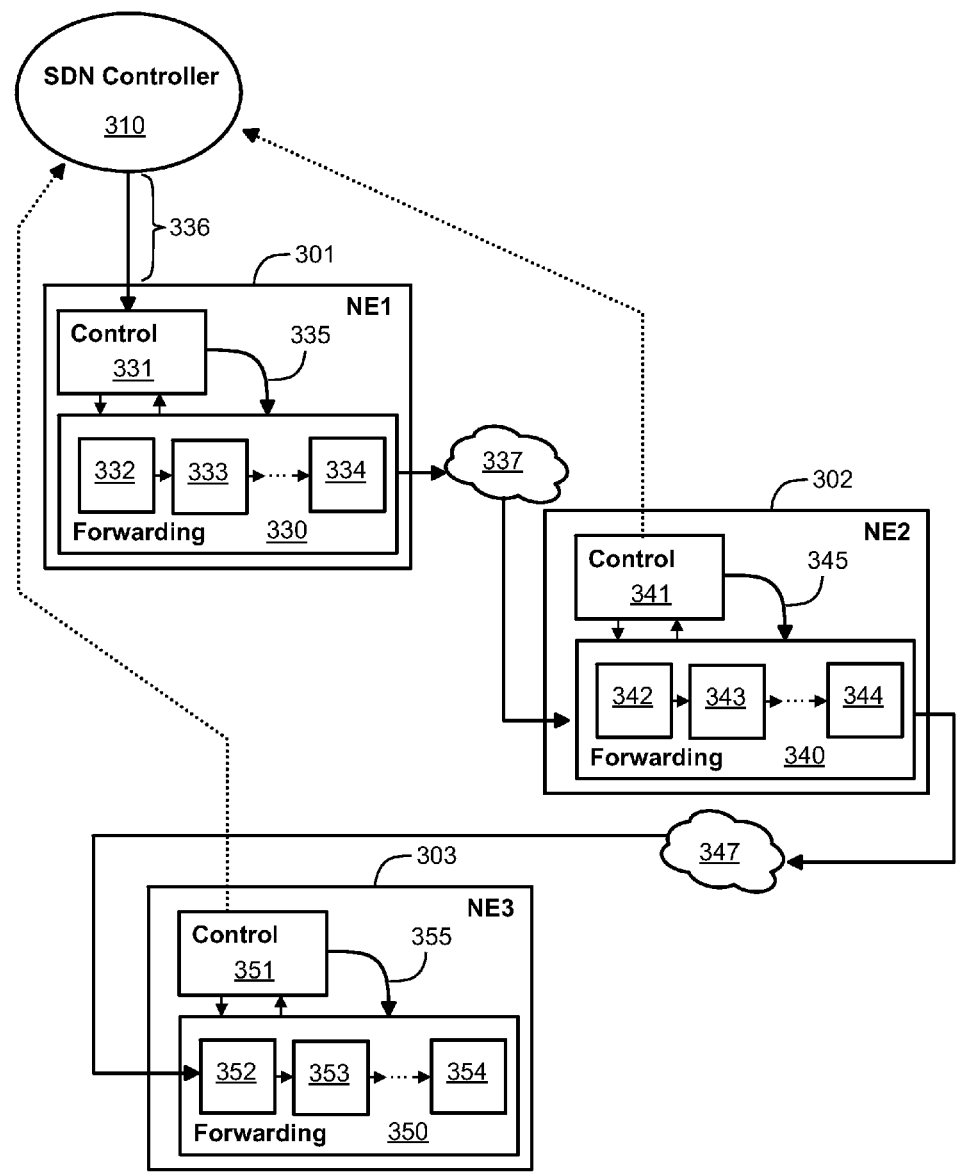

FIG. 3b shows a schematic functional block-diagram of the network element 301 and corresponding functional block diagrams of the other network elements 302 and 303. The control section 331 of the network element 301 and the controller 310 of the software-defined network run a management connection 336 in accordance with OpenFlow or some other suitable configuration protocol in order to transfer the configuration data from the controller 310 to the network element 301. An OpenFlow management connection can be based on for example the Transmission Control Protocol "TCP". The control-section 331 constructs the configuration system of the forwarding-section 330 on the basis of a portion of the configuration data related to the network element 301. The construction of the configuration system is depicted with an arched arrow 335 in FIG. 3b. In this exemplifying case, the configuration system comprises look-up tables 332, 333, and 334 defining one or more actions to be carried out in response to a situation in which one or more entries of the look-up tables are matched as a corollary of receiving data from the software-defined network. The control-section 331 addresses, to the network element 302, the configuration data or at least portions of the configuration data related to the network elements 302 and 303. The control-section 331 delivers the appropriate configuration data to the forwarding-section 330 which transmits the configuration data to the network element 302 via a part 337 of the software-defined network.

The forwarding-section 340 of the network element 302 is unable to determine actions related to the configuration data received from the network element 301, and thus the forwarding-section 340 delivers the configuration data to the control-section 341 of the network element 302. The control-section 341 constructs the configuration system of the forwarding-section 340 on the basis of the portion of the configuration data related to the network element 302. The construction of the configuration system is depicted with an arched arrow 345 in FIG. 3b. In this exemplifying case, the configuration system comprises look-up tables 342, 343, and 344. The control-section 341 addresses, to the network element 303, at least the portion of the configuration data related to the network element 303. The control-section 341 delivers the appropriate configuration data to the forwarding-section 340 which transmits the configuration data to the network element 303 via a part 347 of the software-defined network.

The forwarding-section 350 of the network element 303 is unable to determine actions related to the configuration data received from the network element 302, and thus the forwarding-section 350 delivers the configuration data to the control-section 351 of the network element 303. The control-section 351 constructs the configuration system of the forwarding-section 350 on the basis of the portion of the configuration data related to the network element 303. The construction of the configuration system is depicted with an arched arrow 335 in FIG. 3b. In this exemplifying case, the configuration system comprises look-up tables 352, 353, and 354.

Figure 4:
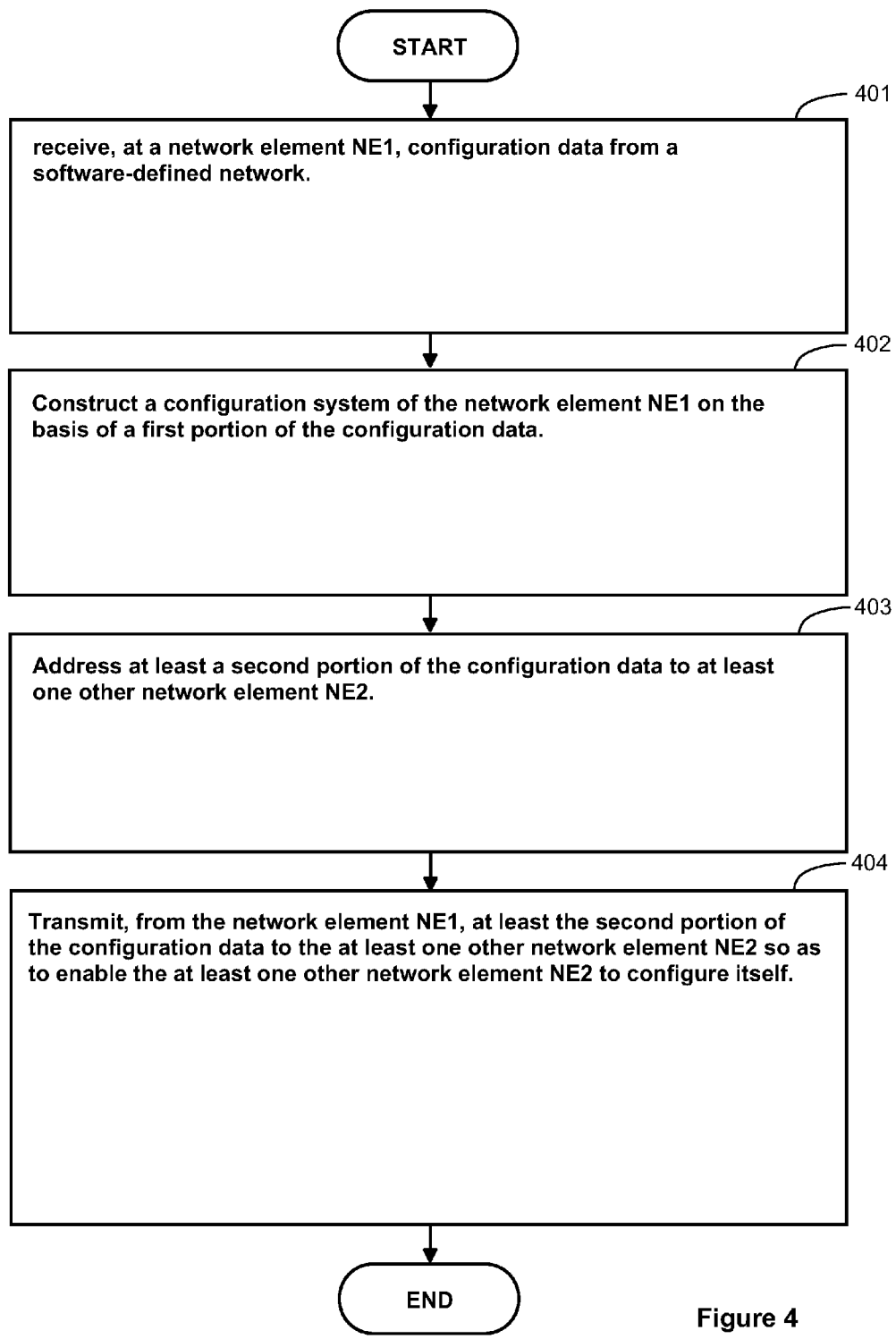
FIG. 4 shows a flow chart of a method according to an exemplifying embodiment of the invention for configuring a software-defined network.

FIG. 4 shows a flow chart of a method according to an exemplifying embodiment of the invention for configuring a software-defined network. The method comprises the following actions:

action 401: receiving, at a network element NE1 of the software-defined network, configuration data from the software-defined network, action 402: constructing, at the network element NE1, a configuration system of the network element on the basis of a first portion of the configuration data, the configuration system enabling the network element to operate as a part of the software-defined network, action 403: addressing, at the network element NE1, at least a second portion of the configuration data to at least one first other network element NE2 of the software-defined network, the second portion of the configuration data comprising data for configuring two or more other network elements including the first other network element NE2, and action 404: transmitting, from the network element NE1 and in accordance with the configuration system, at least the second portion of the configuration data to the first other network element NE2 so as to enable the first other network element to construct a configuration system of the first other network element.

A method according to an exemplifying embodiment of the invention comprises reading, from the configuration data and at the network element NE1, group information identifying the first other network element NE2. In this case, the addressing at least the second portion of the configuration data to the first other network element NE2 is based on the group information.

In a method according to an exemplifying embodiment of the invention, the addressing at least the second portion of the configuration data to the first other network element NE2 is based on pre-determined group information available at the network element NE1 prior to the reception of the configuration data.

A method according to an exemplifying embodiment of the invention comprises maintaining, at each of the network elements, a database containing at least:
- a portion of the configuration data defining a configuration system of the network element under consideration so as to enable the network element to reconstruct its configuration system, and
- a portion of the configuration data transmitted from the network element under consideration so as to enable the network element to re-transmit the transmitted portion of the configuration data.

In a method according to an exemplifying embodiment of the invention, each of the network elements comprises a forwarding-section for forwarding received data and a control-section for controlling and configuring the forwarding-section, and the method comprises delivering data from the forwarding-section of each of the network elements to the control-section of that network element in response to a situation in which the forwarding-section of the network element is unable to determine actions related to the data under consideration. The data whose related actions are unable to be determined by the forwarding-section comprises for example the configuration data.

A method according to an exemplifying embodiment of the invention comprises transmitting the above-mentioned data to a controller of the software-defined network in response to a situation in which the control-section of the network element is unable to determine actions related to the data under consideration.

In a method according to an exemplifying embodiment of the invention, the control-section of the network element determines the actions related to the data under consideration in response to a situation in which the data contains information indicating that the data is to be processed locally, and otherwise the network element transmits the data to a controller of the software-defined network.

In a method according to an exemplifying embodiment of the invention, the configuration system of each of the network elements comprises one or more look-up tables defining one or more actions to be carried out in response to a situation in which one or more entries of the at least one look-up table are matched as a corollary of receiving data from the software-defined network.

In a method according to an exemplifying embodiment of the invention, OpenFlow configuration protocol is run between the network element and a controller of the software-defined network so as to transfer the configuration data to the network element.

In a method according to an exemplifying embodiment of the invention, each of the network elements is at least one of the following: an Internet Protocol IP router, a MultiProtocol Label Switching MPLS switch, a packet optical switch, an Ethernet switch.

A computer program according to an exemplifying embodiment of the invention comprises computer executable instructions for controlling a programmable processing system to carry out actions related to a method according to any of the above-described exemplifying embodiments of the invention.

A computer program according to an exemplifying embodiment of the invention comprises software modules for operating a network element of a software-defined network. The software modules comprise computer executable instructions for controlling a programmable processing system of the network element to:
- construct a configuration system of the network element on the basis of a first portion of configuration data received from the software-defined network, the configuration system enabling the network element to operate as a part of the software-defined network,
- address at least a second portion of the configuration data to at least one first other network element of the software-defined network, the second portion of the configuration data comprising data for configuring two or more other network elements including the first other network element, and
- deliver at least the second portion of the configuration data to a forwarding-section of the network element so as to transmit at least the second portion of the configuration data to the first other network element in accordance with the configuration system constructed on the basis of the first portion of the configuration data.

A computer program according to an exemplifying embodiment of the invention comprises software modules for operating a controller of a software-defined network. The software modules comprise computer executable instructions for controlling a programmable processing system of the controller to:
- generate configuration data enabling network elements to be configured to operate as parts of the software-defined network,
- provide the configuration data with information expressing network element-specific portions of the configuration data,
- address the configuration data to one of the network elements, and
- control the data transfer interface to transmit the configuration data to the one of the network elements.

A computer program according to an exemplifying embodiment of the invention comprises the above-mentioned software modules for operating the network element of the software-defined network and the above-mentioned software modules for operating the controller of the software-defined network.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc "CD", encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising:
   a data transfer interface comprising one or more egress ports that connect to data transfer links of the software-defined network so as to transmit data to the software-defined network, and one or more ingress ports that connect to the data transfer links of the software-defined network so as to receive data from the software-defined network; and
   a processing system for implementing a forwarding-section for maintaining a configuration system enabling the network element to operate as a part of the software-defined network, the configuration system comprising interconnected look-up tables that define actions to be carried out when managing the data received from the software-defined network,
   wherein the processing system comprises one or more processor circuits adapted to implement a control-section for:
      constructing the interconnected look-up tables of the configuration system on the basis of a first portion of configuration data received from the software-defined network,
      addressing at least a second portion of the configuration data to at least one first other network element of the software-defined network, the second portion of the configuration data comprising data for configuring two or more other network elements including the first other network element,
      delivering at least the second portion of the configuration data to the forwarding-section so as to transmit at least the second portion of the configuration data to the first other network element in accordance with the configuration system constructed on the basis of the first portion of the configuration data,
   wherein group information, identifying the first other network element to be configured with the aid of the configuration data, is read from the configuration data, and
   at least the second portion of the configuration data is addressed to the first other network element on the basis of the group information.

2. The network element according to claim 1, wherein the control section is adapted to address at least the second portion of the configuration data to the first other network element on the basis of pre-determined group information available to the control section prior to reception of the configuration data.

3. The network element according to claim 1, wherein the processing system is adapted to store the configuration data to a database so as to enable the network element to reconstruct the configuration system and to retransmit at least the second portion of the configuration data to the first other network element.

4. The network element according to claim 1, wherein the forwarding-section is adapted to deliver data received from the software-defined network to the control-section in response to a situation in which the forwarding-section is unable to determine actions related to the data under consideration, the data whose related actions are unable to be determined by the forwarding-section comprising the configuration data.

5. The network element according to claim 4, wherein the control-section is adapted to control the data transfer interface to transmit the data to a controller of the software-defined network in response to a situation in which the control-section is unable to determine actions related to the data under consideration.

6. The network element according to claim 4, wherein the control-section is adapted to determine the actions related to the data under consideration in response to a situation in which the data contains information indicating that the data is to be processed locally, and otherwise to control the data transfer interface to transmit the data to a controller of the software-defined network.

7. The network element according to claim 1, wherein the control-section is adapted to support OpenFlow configuration protocol for receiving the configuration data from a controller of the software-defined network.

8. The network element according to claim 1, wherein the network element is at least one of the following: an Internet Protocol IP router, a MultiProtocol Label Switching MPLS switch, a packet optical switch, an Ethernet switch.

9. A method for configuring a software-defined network, the method comprising:
   receiving, at a network element of the software-defined network, configuration data from the software-defined network;
   constructing, at the network element, interconnected look-up tables of a configuration system of the network element on the basis of a first portion of the configuration data, the configuration system enabling the network element to operate as a part of the software-defined network, the interconnected look-up tables defining actions to be carried out when managing data received at the network element under consideration;
   addressing, at the network element, at least a second portion of the configuration data to at least one first other network element of the software-defined network, the second portion of the configuration data comprising data for configuring two or more other network elements including the first other network element; and
   transmitting, from the network element and in accordance with the configuration system, at least the second portion of the configuration data to the first other network element so as to enable the first other network element to construct a configuration system of the first other network element,
   wherein group information identifying the first other network element is read from the configuration data, and
   wherein the addressing of at least the second portion of the configuration data to the first other network element is based on the group information.

10. The method according to claim 9, wherein the addressing at least the second portion of the configuration data to the first other network element is based on pre-determined group information available at the network element prior to the reception of the configuration data.

11. The method according to claim 9, further comprising:
maintaining, at each of the network elements, a database containing at least:
a portion of the configuration data defining a configuration system of the network element under consideration so as to enable the network element to reconstruct its configuration system, and
a portion of the configuration data transmitted from the network element under consideration so as to enable the network element to re-transmit the transmitted portion of the configuration data.

12. The method according to claim 9, wherein each of the network elements comprises a forwarding-section for forwarding received data and a control-section for controlling and configuring the forwarding-section, and the method comprises delivering data from the forwarding-section of each of the network elements to the control-section of that network element in response to a situation in which the forwarding-section of the network element is unable to determine actions related to the data under consideration, the data whose related actions are unable to be determined by the forwarding-section comprising the configuration data.

13. The method according to claim 12, wherein the method comprises transmitting the data to a controller of the software-defined network in response to a situation in which the control-section of the network element is unable to determine actions related to the data under consideration.

14. The method according to claim 12, wherein the control-section of the network element determines the actions related to the data under consideration in response to a situation in which the data contains information indicating that the data is to be processed locally, and otherwise the network element transmits the data to a controller of the software-defined network.

15. The method according to claim 9, wherein OpenFlow configuration protocol is nm between the network element and a controller of the software-defined network so as to transfer the configuration data to the network element.

16. The method according to claim 9, wherein each of the network elements is at least one of the following: an Internet Protocol IP router, a MultiProtocol Label Switching MPLS switch, a packet optical switch, an Ethernet switch.

17. A non-transitory computer readable medium encoded with a computer program comprising computer executable instructions for controlling a programmable processing system of a network element of a software-defined network to:
construct interconnected look-up tables of a configuration system of the network element on the basis of a first portion of configuration data received from the software-defined network, the configuration system enabling the network element to operate as a part of the software-defined network, the interconnected look-up tables defining actions to be carried out when managing data received at the network element under consideration;
address at least a second portion of the configuration data to at least one first other network element of the software-defined network, the second portion of the configuration data comprising data for configuring two or more other network elements including the first other network element; and
deliver at least the second portion of the configuration data to a forwarding-section of the network element so as to transmit at least the second portion of the configuration data to the first other network element in accordance with the configuration system constructed on the basis of the first portion of the configuration data,
wherein group information, identifying the first other network element to be configured with the aid of the configuration data, is read from the configuration data, and
at least the second portion of the configuration data is addressed to the first other network element on the basis of the group information.

\* \* \* \* \*